United States Patent [19]

Rike

[11] Patent Number: 5,560,457

[45] Date of Patent: Oct. 1, 1996

[54] BLEEDER SCREW FOR DISC BRAKE ASSEMBLY

[75] Inventor: Russell E. Rike, Spring Valley, Ohio

[73] Assignee: Dayton Walther Corporation, Dayton, Ohio

[21] Appl. No.: 399,418

[22] Filed: Mar. 7, 1995

[51] Int. Cl.$^6$ .................................. F16K 31/44
[52] U.S. Cl. .................... 188/352; 188/72.4; 188/370; 251/216
[58] Field of Search .................... 188/352, 72.4, 188/370, 152; 60/584; 251/217, 216, 351

[56] References Cited

U.S. PATENT DOCUMENTS

| | | | |
|---|---|---|---|
| 2,892,614 | 6/1959 | Majneri | 188/352 |
| 3,578,285 | 5/1971 | Carlton | 251/218 |
| 3,868,001 | 2/1975 | Yokoi | 188/72.4 |
| 4,164,241 | 8/1979 | Kubo | 188/352 |
| 4,445,530 | 5/1984 | Meixell | 251/351 |
| 4,470,577 | 9/1984 | Warwick | 188/352 |
| 4,834,140 | 5/1989 | Schmidt | 188/352 |
| 5,226,452 | 7/1993 | Muller et al. | |
| 5,447,214 | 9/1995 | Appelgren | 188/352 |

*Primary Examiner*—Douglas C. Butler
*Attorney, Agent, or Firm*—MacMillan, Sobanski & Todd

[57] ABSTRACT

A bleeder screw for use in a disc brake assembly including a caliper provided with at least one cylindrical recess formed therein and at least one aperture formed therein. The aperture in the caliper includes a non-threaded portion and a threaded portion. A piston is slidably disposed in the recess, and a pair of brake shoes are carded by the disc brake assembly and disposed on opposite axial sides of an associated rotor. Each of the brake shoes includes a backing plate and a friction pad. An actuation system is carded by the caliper for selectively moving the brake shoes between a non-braking position, wherein each of the friction pads is spaced apart from the adjacent side of the rotor, and a braking position, wherein each of the friction pads frictionally engages the adjacent side of the rotor. The bleeder screw is threadably disposed in the aperture of the caliper. The bleeder screw includes an elastomeric seal disposed about a portion thereof. The elastomeric seal engages at least a portion of the non-threaded portion of the aperture when the bleeder screw is disposed in the aperture.

3 Claims, 5 Drawing Sheets

BLEEDER SCREW FOR DISC BRAKE ASSEMBLY

BACKGROUND OF THE INVENTION

This invention relates in general to vehicle disc brake assemblies and in particular to an improved structure for a bleeder screw adapted for use in such a vehicle disc brake assembly.

Most vehicles are equipped with a brake system for retarding or stopping movement of the vehicle in a controlled manner. A typical brake system for an automobile and light duty truck includes a disc brake assembly for the front wheels of the vehicle, and either a disc brake assembly or a drum brake assembly for the rear wheels of the vehicle. A typical brake system for a medium duty truck includes a disc brake assembly on all four wheels of the vehicle. The brake assemblies are typically actuated by hydraulic or pneumatic pressure generated when an operator of the vehicle depresses a brake pedal. The structures of the disc brake assembly, as well as the actuators therefor, are well known in the art.

There are two basic types of calipers for use in disc brake assemblies, namely, a "floating" caliper disc brake assembly, and a "fixed" caliper disc brake assembly. A floating caliper type of disc brake assembly is usually used on automobiles and light and medium duty trucks. A conventional floating caliper type of disc brake assembly includes a brake caliper which is supported by a pair of pins for sliding movement relative to an anchor plate which is secured to a fixed, non-rotatable component of the vehicle. A fixed caliper type of disc brake assembly is sometimes used on automobiles and light and medium duty trucks. A conventional fixed caliper type of disc brake assembly includes a brake caliper which is solidly fixed to a fixed, non-rotatable component of the vehicle.

In both types of disc brake assemblies, a pair of brake shoes are supported by the disc brake assembly for sliding movement relative thereto. The brake shoes have respective friction pads which are disposed on opposite sides of a rotor. The rotor, in turn, is connected to the wheel of the vehicle for rotation therewith. To effect braking action, the brake shoes are moved inwardly toward one another so as to frictionally engage the opposed sides of the rotor. Such frictional engagement causes retarding or stopping of the rotational movement of the rotor and, therefore, the wheel of the vehicle in a controlled manner.

To accomplish this in a fixed caliper type of disc brake assembly, the brake caliper assembly includes an inboard caliper assembly disposed adjacent an inboard brake shoe and an outboard caliper assembly disposed adjacent an outboard brake shoe. One or more hydraulically or pneumatically actuated pistons are provided in respective cylindrical recesses formed in the inboard caliper assembly adjacent the inboard brake shoe, and one or more hydraulic, ally or pneumatically actuated; pistons are provided in respective cylindrical recesses formed in the outboard caliper assembly adjacent the outboard brake shoe. This type of construction is commonly referred to as an "opposed" piston caliper design. When the brake pedal is depressed, the pistons urge the brake shoes toward one another and into engagement with the associated side of the rotor. As result, the brake shoes frictionally engage the opposed sides of the rotor.

Typically, when the disc brake assembly is initially connected to the vehicle hydraulic or pneumatic brake system, air is present in the system. Thus, the disc brake assembly includes one or more bleeder screws which are used to bleed the air from the vehicle brake system. The bleeder screw is secured in a threaded aperture provided in the disc brake assembly and is connected via a passageway to the associated fluid chamber thereof. A typical bleeder screw includes a passageway formed therethrough to bleed the air from the brake system. The bleeder screw typically remains secured to the disc brake assembly and, when not being used, includes a cap installed on the outer end thereof.

In order to bleed air from the brake system, the cap is removed and the bleeder screw is slightly unscrewed to allow the air to escape through the passageway to the atmosphere in a known manner. Unfortunately, once the disc brake assembly is installed on the vehicle, the disc brake assembly is subject to dirt, mud, water, and other debris which may damage and corrode the threads of the bleeder screw and aperture. Thus, when it is attempted to unscrew the bleeder screw, the bleeder screw may become seized in the aperture and/or brake during this process. In order to prevent this, it is known to coat the threads of the bleeder screw, the threads of the aperture, or both with a corrosion resistant coating. However, the coating is subject to chipping, wear, and related deterioration. Also, in a hydraulically actuated disc brake system, the corrosion from the threads may become dispersed in the hydraulic brake fluid and affect the operation of the system. Thus, it would be desirable to provide an improved structure for a brake bleeder screw for use in a disc brake assembly which protects the threads of the bleeder screw and aperture of the disc brake assembly, yet is relatively inexpensive and easy to manufacture.

SUMMARY OF THE INVENTION

This invention relates to an improved structure for a bleeder screw adapted for use in a disc brake assembly which protects the threads of the bleeder screw and associated aperture in the caliper from corrosion. In particular, the disc brake assembly includes a caliper provided with at least ,one cylindrical recess formed therein and at least one aperture formed therein aperture in the caliper includes a non-threaded portion and a threaded portion. A piston is slidably disposed in the recess, and a pair of brake shoes are carried by the disc brake assembly and disposed on opposite axial sides of an associated rotor. Each of the brake shoes includes a backing plate and a friction pad. An actuation system is carried by the caliper for selectively moving the brake shoes between a non-braking position, wherein each of the friction pads is spaced apart from the adjacent side of the rotor, and a braking position, wherein each of the friction pads frictionally engages the adjacent side of the rotor. The bleeder screw is threadably disposed in the aperture of the caliper. The bleeder screw includes an elastomeric seal disposed about a portion thereof. The elastomeric seal engages at least a portion of the non-threaded portion of the aperture when the bleeder screw is disposed in the aperture.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
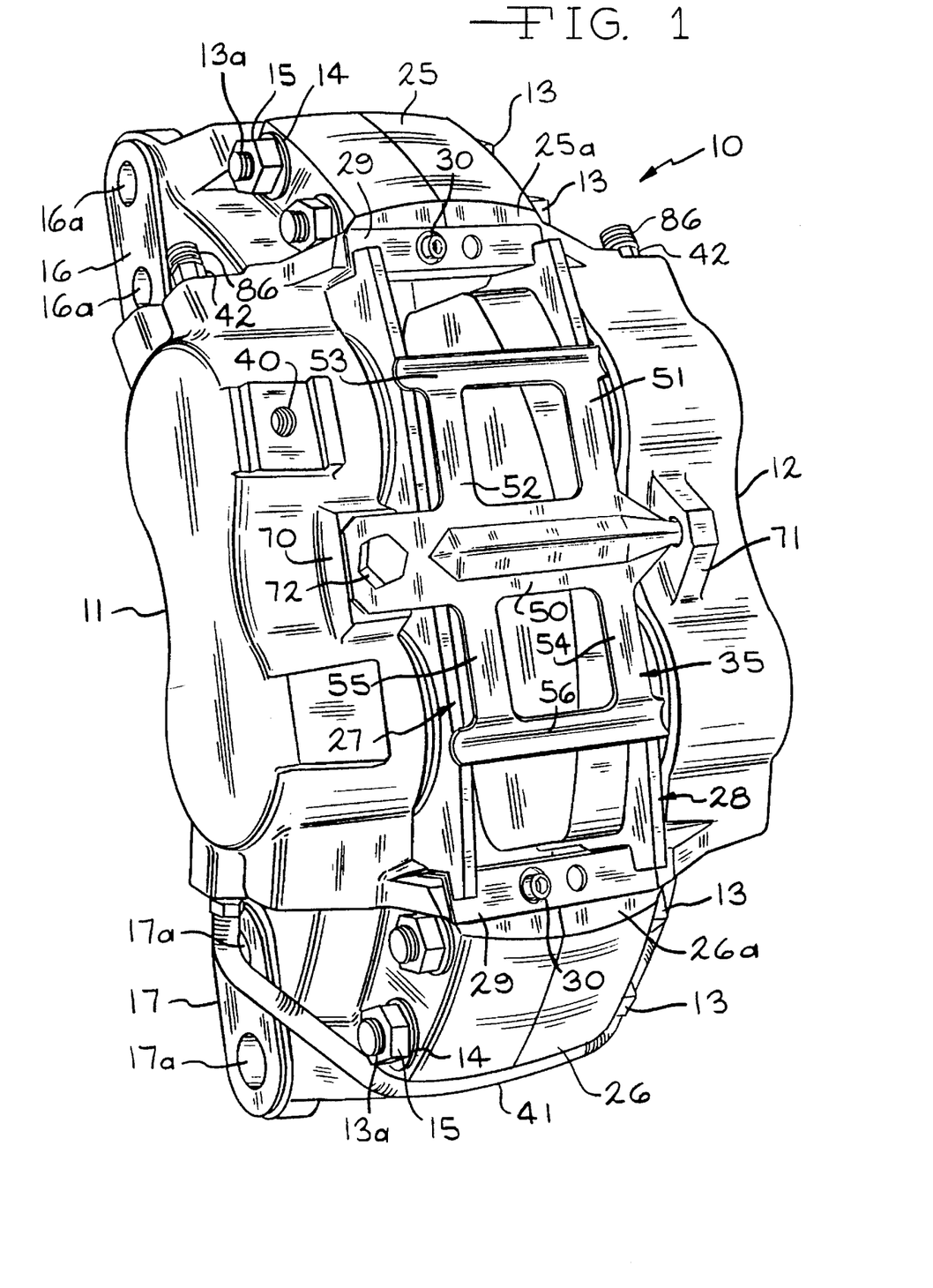
FIG. 1 is a perspective view of a portion of a vehicle disc brake assembly including an improved bleeder screw in accordance with this invention.
Figure 2:
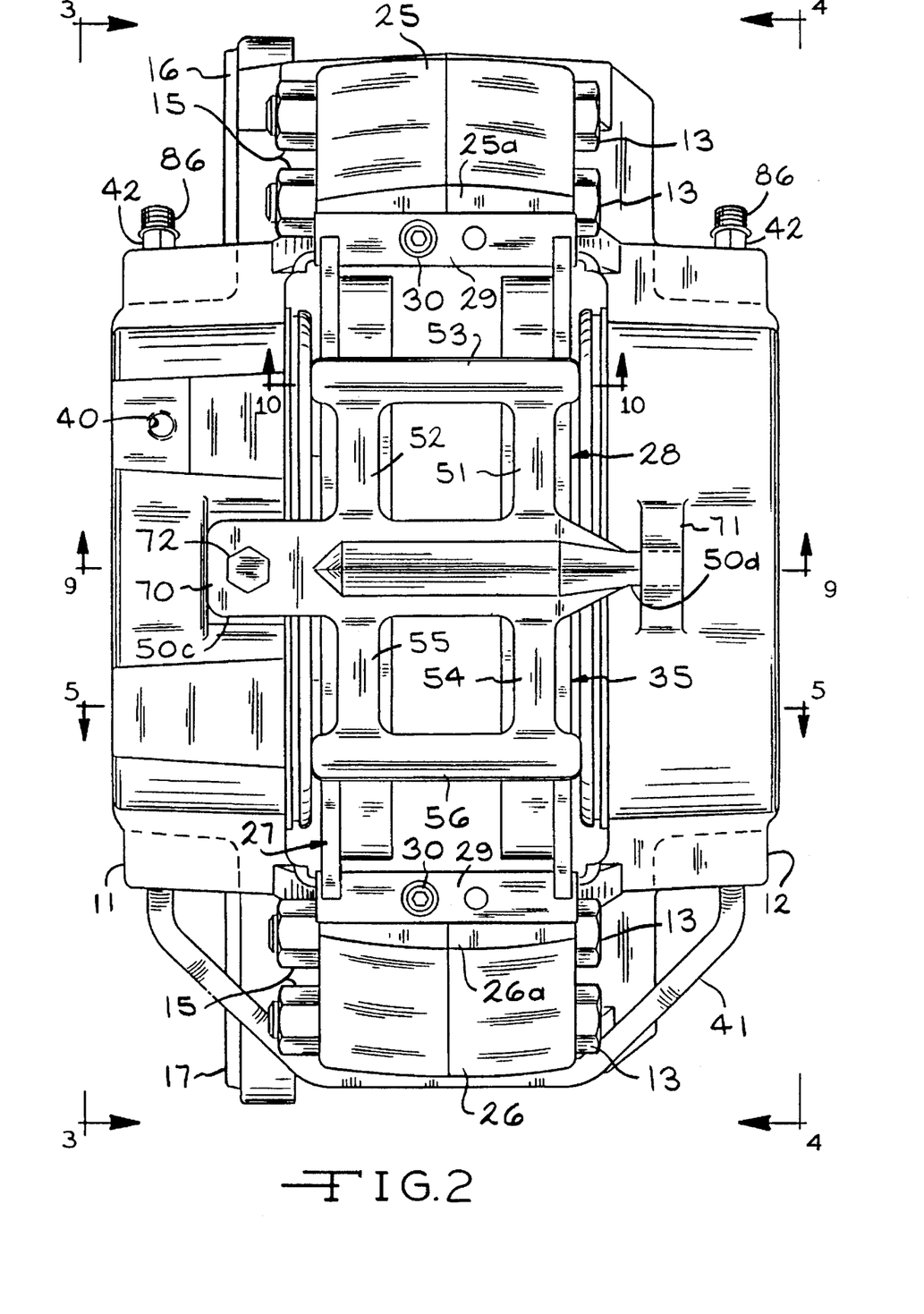
FIG. 2 is a top plan view of the disc brake assembly illustrated in FIG. 1.

Referring now to the drawings, there is illustrated in FIGS. 1 and 2 a vehicle disc brake assembly, indicated generally at 10, and constructed in accordance with the present invention. The general structure and operation of the disc brake assembly 10 is conventional in the art. Thus, only those portions of the disc brake assembly 10 which are necessary for a full understanding of this invention will be explained and illustrated.

Figure 3:
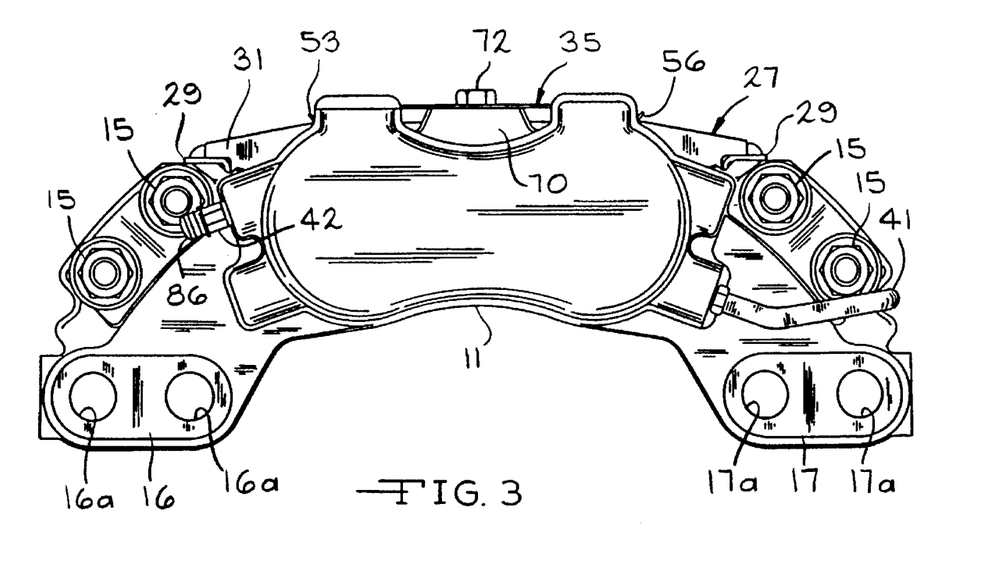
FIG. 3 is an elevational view of the disc brake assembly taken along line 3—3 of FIG. 2.
Figure 4:
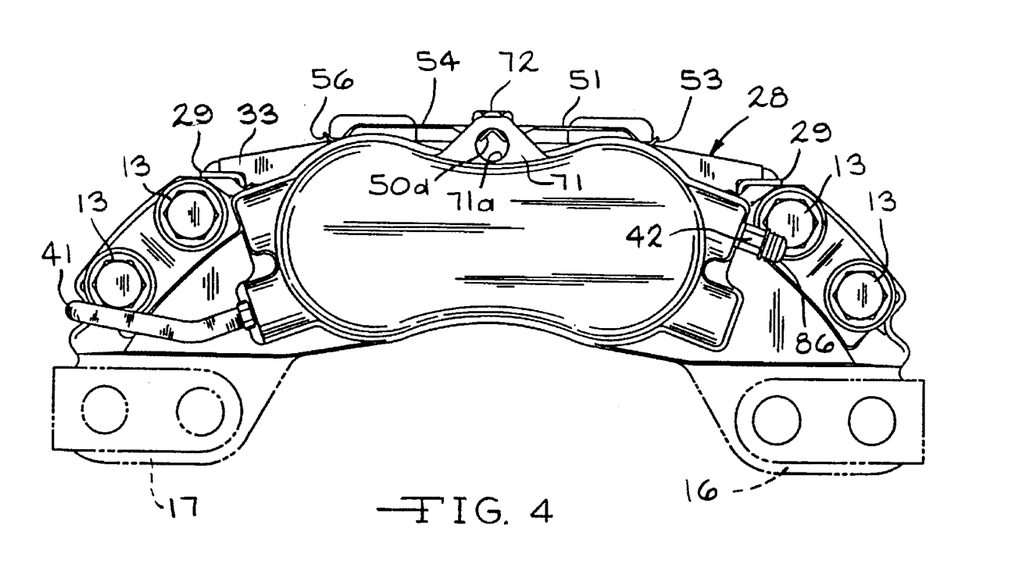
FIG. 4 is an elevational view of the disc brake assembly taken along line 4—4 of FIG. 2.

The illustrated disc brake assembly is an opposed four piston fixed caliper type of disc brake assembly, and is associated with a fight wheel of a vehicle. The disc brake assembly 10 is a two-piece construction, and includes an inboard brake caliper assembly 11, best shown in FIG. 3, and an outboard brake caliper assembly 12, best shown in FIG. 4. The construction of the inboard caliper assembly 11 and the outboard caliper assembly 12 are generally similar to one another, and like reference numbers will be used for corresponding parts. Alternatively, the inboard caliper assembly 11 and the outboard caliper assembly 12 may be integrally formed.

The inboard brake caliper assembly 11 and the outboard brake caliper assembly 12 are provided with respective pairs of aligned apertures formed therethrough. Threaded bolts 13 extend through the respective pairs of apertures, and washer's 14 and nuts 15 are installed on threaded ends 13a of the bolts 13 to secure the inboard caliper assembly 11 to the outboard caliper assembly 12.

The inboard caliper assembly 11 includes a pair of anchoring arms 16 and 17 provided at opposed ends thereof. Each of the arms 16 and 17 are provided with a pair of apertures 16a and 17a, respectively, formed therethrough, and are adapted to receive bolts (not shown) for securing the inboard caliper assembly 11, and therefore the assembled disc brake assembly 10, to a fixed, non-rotatable component of the vehicle, such as an axle flange (when the disc brake assembly is installed for use on the rear of the vehicle), or a steering knuckle (when the disc brake assembly is installed for use on the front of the vehicle).

Figure 5:
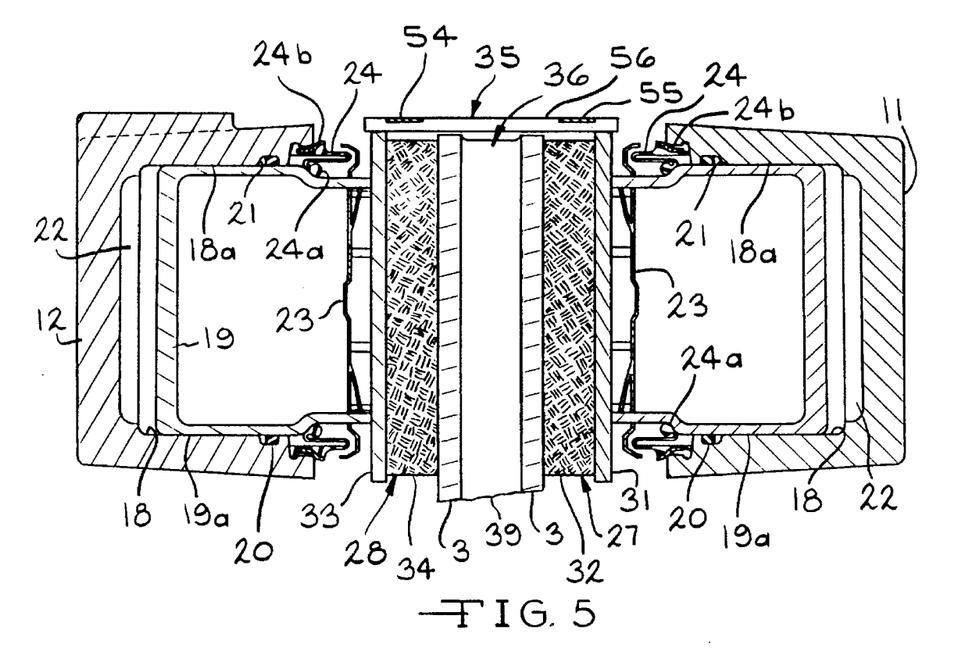
FIG. 5 is a cross-sectional view taken along line 5—5 of FIG. 2.

The illustrated inboard caliper assembly 11 includes a pair of cylindrical recesses 18 formed therein, only one recess 18 is shown in FIG. 5. Similarly, the outboard caliper assembly 12 includes a pair of cylindrical recesses 18 foraged therein, only one recess 18 is shown in FIG. 5. A piston 1.9 is disposed in each of the cylindrical recesses 18, and a fluid seal 20 is disposed in an annular groove 21 formed in a side wall 18a of the cylindrical recess 18, and engages an outer side wall 19a of the piston 19. The fluid seal 20 is provided to define a sealed hydraulic actuator chamber 22, within which the piston 19 is disposed for sliding movement.

In particular, the inboard caliper assembly 11 includes a pair of hydraulic actuator chambers 22 which are connected together by a fluid passageway (not shown) formed therein. Similarly, the outboard caliper assembly 12 includes a pair of hydraulic actuator chambers 22 which are connected together by a fluid passageway (not shown) formed therein. Also, the fluid seal 20 is designed to function as a roll-back seal which retracts the piston 19 within the cylindrical recess 18 when the disc brake assembly 10 is not actuated. Thus, it will be appreciated that the illustrated brake actuating means is a hydraulic actuating means. However, other well known types of actuating means, such as pneumatic, electrical, and mechanical, can be used. Also, a heat shield 23 is preferably provided adjacent an outboard end of each of the pistons 19.

A dust boot seal 24 is provided about the outboard end of the piston 19 to prevent water, dirt, and other contaminants from entering into the cylindrical recess 18. The dust boot seal 24 is formed from a flexible material and has a first end 24a which engages the outer side wall 19a of the piston 19 and a second end 24b which engages an annular recess formed adjacent the open ends of the associated cylindrical recesses 18. A plurality of flexible convolutions are provided in the dust boot seal 24 between the first and second ends thereof to accommodate movement of the pistons 19 within each of the respective cylindrical recesses 18.

The disc brake assembly 10 includes a pair of arms 25 and 26 having respective guide rails 25a and 26a formed thereon. The guide rails 25 and 26 extend transverse to the arms 25 and 26, and extend parallel to one another. As will be discussed, a pair of brake shoes 27 and 28 are supported on the guide rails 25a and 26a for sliding movement relative thereto. Preferably, a hardened replaceable insert 29 is secured to each of the guide rail 25 and 26 by a fastener 30. The inserts 29 are preferably formed from stainless steel, and provide a smooth, corrosion resistant sliding surface for the brake shoes 27 and 28.

The inboard brake shoe 27 includes a backing plate 31 having a friction pad 32 secured thereto. Similarly, the outboard brake shoe 28 includes a backing plate 33 having a friction pad 34 secured thereto.

In the illustrated embodiment, a brake shoe hold down clip 35 is releasably attached to the disc brake assembly 10 to bias opposed upper ends 31a and 33a of the backing; plates 31 and 33, respectively, of brake shoes 27 and 28 against the guide rails 25a and 26a. The hold down clip 35 is generally arcuate shaped, and is formed having a longitudinally extending central mounting portion 50. A first pair of opposed spaced apart arms 51 and 52 extend transverse to and outwardly from one side 50a of the central mounting portion 50. The ends of the first pair of arms 51 and 52 terminate at and are interconnected by a generally U-shaped first end arm 53 which extends generally parallel to the central mounting portion 50.

The hold down clip 35 further includes a second pair of spaced apart arms 54 and 55 extend transverse to and outwardly from the opposite side 50b of the central mounting portion 50. The ends of the second pair of arms 54 and 55 terminate at and are interconnected by a generally U-shaped second end arm 56 which extends generally parallel to the central mounting portion 50.

The central mounting portion 50 further includes an aperture formed adjacent one end 50c thereof, and a raised, generally inverted V-shaped strengthening rib 61 which extends substantially the entire length thereof and terminates at an opposite end 50d. The end 50d of the hold down clip is disposed in an opening formed in a raised mounting pad 71 provided on the outboard caliper assembly 12. A bolt 72 having a threaded end extends through the aperture 60 in the hold down clip 35 and is threadably received in a threaded aperture formed in a raised mounting pad 70 provided on the inboard caliper assembly 11.

As shown in FIG. 5, the brake shoes 27 and 28 are disposed on opposite sides of a rotor 36. The rotor 36 is generally flat and circular in shape and is secured in a conventional manner to a rotatable wheel (not shown) of the vehicle. The illustrated rotor 36 includes a pair of opposed braking discs 37 and 38 which are spaced apart from one another by a plurality of intermediate vanes 39 in a known manner.

When it is desired to actuate the disc brake assembly 10 to retard or stop the rotation of the brake rotor 36 and the vehicle wheel associated therewith, the driver of the vehicle depresses the brake pedal (not shown). In a manner which is well known in the art, the depression of the brake pedal causes pressurized hydraulic fluid to be introduced into the disc brake assembly via a threaded inlet port 40 provided in the inboard caliper assembly 11. The inlet port 40 is connected through a brake line (not shown) to a master cylinder (not shown) of the vehicle brake system. The brake line is attached to the inlet port 40 by a threaded fitting (not shown). The fluid flows from the inlet port 40 into the inboard fluid chambers 22 to urge the associated pistons 19 in the inboard caliper assembly 11 in the outboard direction (toward the left when viewing FIG. 5) into engagement with the backing plate 31 of the inboard brake shoe 27.

The fluid chambers 22 of the inboard caliper assembly 11 are connected to the fluid chambers 22 of the outboard caliper assembly 12 by a fluid supply assembly 41. Thus, at the same time, the fluid flows through the fluid supply assembly 41 into the outboard fluid chambers 22 to urge the associated pistons 19 in the outboard caliper assembly 12 in the inboard direction (toward the left when viewing FIG. 5) into engagement with the backing plate 33 of the outboard brake shoe 28. As a result, the friction pad 32 of the inboard brake shoe 27 is moved into frictional engagement with the inboard braking disc 37 of the rotor 36, and the friction pad 34 of the outboard brake shoe 28 is simultaneously moved into frictional engagement with the outboard braking disc 38 of the brake rotor 36. As a result, the, rotor 36 is frictionally engaged by the friction pads 32 and 34 to retard relative rotational movement thereof.

Figure 7:
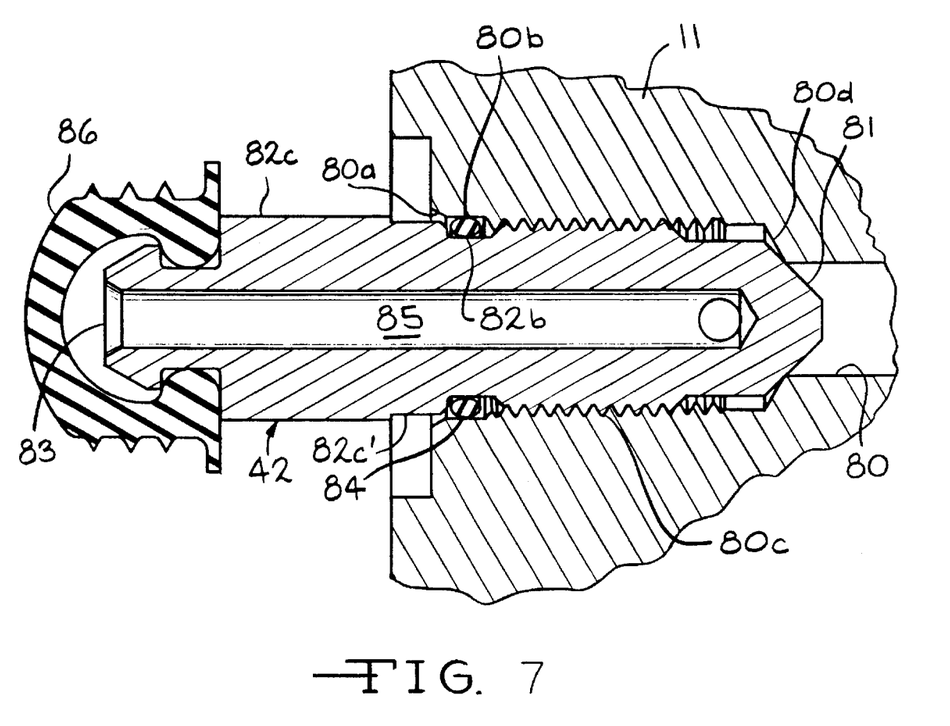
FIG. 7 is a cross-sectional view taken along line 7—7 of FIG. 2.

The disc brake assembly 10 further includes a pair of bleeder screws 42 which are received in a threaded aperture 80, shown in FIG. 7, provided in each of the inboard caliper assembly 11 and the outboard caliper assembly 12. The aperture 80 includes an outer chamfered portion 80*a*, a counterbore portion 80*b*, a threaded portion 80*c*, and an inner chamfered portion 80*d*. The purposes of the portions 80*a*, 80*b*, 80*c* and 80*d* of the aperture 80 will be discussed below. The bleeder screws 42 are provided to bleed air from the associated fluid chambers 22 when the disc brake assembly 10 is initially connected to the vehicle hydraulic brake system.

Figure 6:
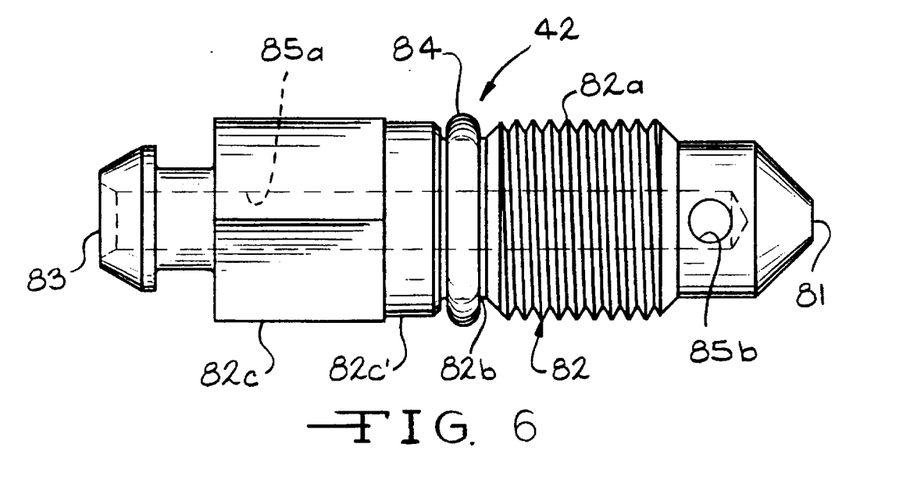
FIG. 6 is an enlarged view of the bleeder screw.

As best shown in FIGS. 6 and 7, the bleeder screw 42 includes an inner chamfered end 81, a stepped main body portion 82, and a flared outer end 83. The main body portion 82 includes a first section 82*a*, a second section 82*b*, and a third section 82*c*. The first section 82*a* is provided with external threads securing each of the bleeder screws 42 in the associated threaded apertures 80 of the disc brake assembly. The second section 82*b* includes a reduced outer diameter and defines an annular groove for receiving an elastomeric seal 84. In the preferred embodiment, the elastomeric seal 84 is illustrated as being a rubber O-ring 84. Also, in the illustrated embodiment, the third section 82*c* is provided with a hexagon shaped outer surface for receiving a suitable tool, such as a wrench, adapted to be used to secure the bleeder screw 42 in the aperture 80. The third section 82*c* further includes a cylindrical shaped section 82*c*' for a purpose to be discussed below.

The bleeder screw 42 further includes a passageway 85 formed therein. The passageway 85 is defined by an axially extending passageway 85*a* and a radially extending passageway 85*b*. A protective elastomeric cap 86 is secured on the outer end 83 of the brake bleeder screw 42 in a conventional manner. The cap 86 functions to protect the passageway 85 from external debris which may block the passageway 85 or cause corrosion, and is readily removed to bleed air from the brake system.

As shown in FIG. 7, when the bleeder screw 42 is in its normal installed position, the chamfered end 81 of the bleeder screw 42 engages the chamfered portion 80*d* of the aperture 80 to prevent fluid flow between the brake system and the atmosphere. In order to bleed air from the brake system, the bleeder screw 42 is sufficiently unscrewed to move the chamfered end 81 of the bleeder screw 32 from engagement with the chamfered end 80*d* of the aperture 80. As a result, air in the brake system is bled to the atmosphere via the passageway 85 in the bleeder screw 42.

When the bleeder screw 42 is installed in the aperture 80, it is important that the O-ring 84 provide an air-tight and fluid-tight seal to protect the threaded portion 82*a* of the bleeder screw 42 and threaded portion 80*c* of the aperture, 80 from external debris which may cause, corrosion. However, the outer diameter of the O-ring is slightly greater than the inner diameter of the counterbore portion 80*b* of the aperture 80. Thus, during insertion of the bleeder screw 42 into the aperture 80, the O-ring 84 is compressed as it is installed in the aperture 80. As a result, it is important to ensure that the O-ring 84 is not damaged during installation of the bleeder screw 42.

To accomplish this, the chamfer 80*a* in the aperture 80 defines an angled engagement surface for the O-ring 84 upon initial engagement therewith. Thus, as the bleeder screw 42 is further advanced, the chamfer 80*a* gradually compresses the O-ring 84 and provides a generally smooth transition to the counterbore portion 80*b* of the aperture 80 as the O-ring 84 is further inserted and then seated in the counterbore 80*b*. Accordingly, the shape of the aperture 80 minimizes the possibility of damage to the O-ring 84 as the bleeder screw 42 is installed. As shown in FIG. 7, the cylindrical shaped section 82*c*' of the third section 82*c* of the bleeder screw 42 has an outer diameter which is smaller than an inner diameter of the counterbore 80*b* of the aperture 80. Thus, when the bleeder screw 42 is threaded into the aperture 80, the cylindrical shaped section 82*c*' can move axially within the counterbore 80*b*.

It will be appreciated that while the present invention has been described and illustrated in conjunction with the particular vehicle disc brake assembly disclosed herein, the invention may be used in conjunction with other disc brake assemblies. For example, the invention may be used in conjunction with a sliding caliper type of disc brake assembly.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A disc brake assembly comprising:

a rotor adapted to be connected to a vehicle wheel for rotation therewith;

a caliper having a recess and an aperture communicating with said recess formed therein, said aperture including a non-threaded outer portion, a threaded intermediate portion, and an inner chamfered portion, said non-threaded outer portion including a counterbore portion defining an inner diameter;

a piston slidably disposed in said recess;

a pair of friction pads earned by said caliper and disposed on opposite sides of said rotor;

actuation means for selectively moving said friction pads between a non-braking position, wherein said friction pads are spaced apart from said rotor, and a braking position, wherein said friction pads frictionally engage said rotor; and a bleeder screw threadably disposed in said aperture of said caliper, said bleeder screw including an inner chamfered end, an outer end, and a main body extending between said inner chamfered end and said outer end, a passageway being formed through said bleeder screw which is adapted to bleed air from the disc brake assembly when said inner chamfered end of said bleeder screw is moved from engagement with said inner chamfered portion of said aperture, said main body including a first section adjacent said inner end having an external thread along a portion thereof defining a first section outer diameter, a second section adjacent said first section having an annular recess formed therein defining a second section outer diameter, and a third section adjacent said second section including a cylindrically shaped section and a hexagonly shaped section, said cylindrically shaped section defining a third section outer diameter, wherein said first section outer diameter and said third section outer diameter are greater than said second section outer diameter, and said third section outer diameter is less than said inner diameter of said counterbore portion; and an elastomeric seal disposed in said annular recess of said second section of said main body, said elastomeric seal adapted to sealingly engage a portion of said non-threaded outer portion of said aperture when said bleeder screw is disposed in said aperture.

2. The disc brake assembly defined in claim 1 wherein said counterbore portion includes an outer chamfered portion.

3. The disc brake assembly define in claim 1 wherein said outer end of said bleeder screw is flared.

* * * * *

UNITED STATES PATENT AND TRADEMARK OFFICE
CERTIFICATE OF CORRECTION

PATENT NO. : 5,560,457
DATED : October 1, 1996
INVENTOR(S) : Russell E. Rike It is certified that error appears in the above-indentified patent and that said Letters Patent is hereby corrected as shown below:

Column 7, Claim 1, Line 14, after "pads", change "earned" to -- carried --.

Signed and Sealed this

Fourteenth Day of January, 1997

Attest:

BRUCE LEHMAN

*Attesting Officer*     *Commissioner of Patents and Trademarks*